Oct. 31, 1950      G. W. CRISE      2,528,037
SOLID FUEL FURNACE HAVING THERMALLY CONTROLLED
FUEL AND AIR SUPPLY MEANS
Filed March 7, 1945

Inventor
George W. Crise

By *H. D. McDowell*

Attorney

Patented Oct. 31, 1950

2,528,037

UNITED STATES PATENT OFFICE 2,528,037

SOLID FUEL FURNACE HAVING THERMALLY CONTROLLED FUEL AND AIR SUPPLY MEANS

George W. Crise, Columbus, Ohio

Application March 7, 1945, Serial No. 581,417

7 Claims. (Cl. 110—32)

The object of my invention is to provide an automatic solid fuel-burning furnace for heating water, or other fluid heat carriers, with greater efficiency and convenience than is possible with the conventional furnace systems.

Another object is to provide a furnace adapted for the burning of solid fuels in such manner as to eliminate or minimize the formation of ash clinkers, reduce the operation of flue cleaning and simplify the problem of ash removal.

A further object is to provide a furnace which functions to provide quicker response to automatic temperature regulation than is afforded by conventional coal-burning systems.

A further object is to provide a furnace with a fuel-feeding and combustion conduit in association with means for forcing air through the fuel contained in the conduit, whereby to effect active combustion of the fuel in a restricted zone of the conduit, thermostatic means responsive to the temperature of said combustion zone being provided for controlling the rate of fuel advance through said conduit and localizing its region of active combustion therein.

For further understanding of the invention, reference is to be had to the following description and the accompanying drawings, wherein.

Figure 1:
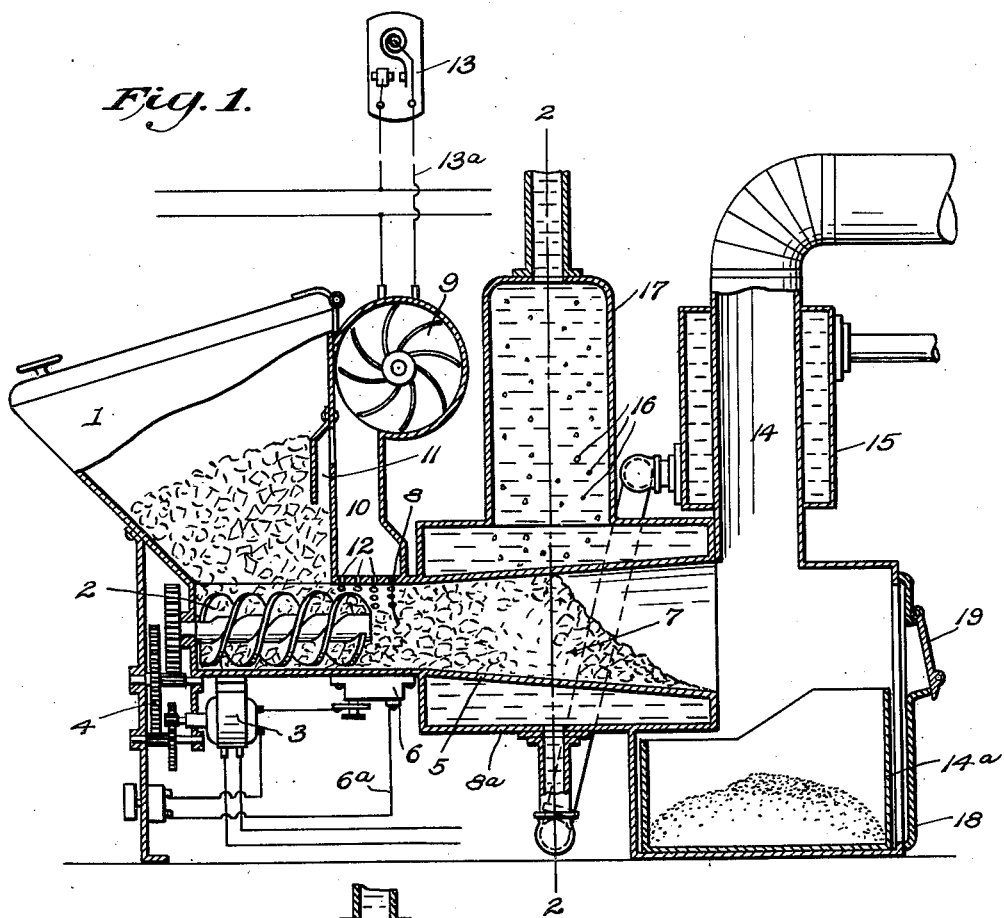
Fig. 1 is a vertical longitudinal sectional view taken through the automatic furnace construction forming the present invention.
Figure 2:
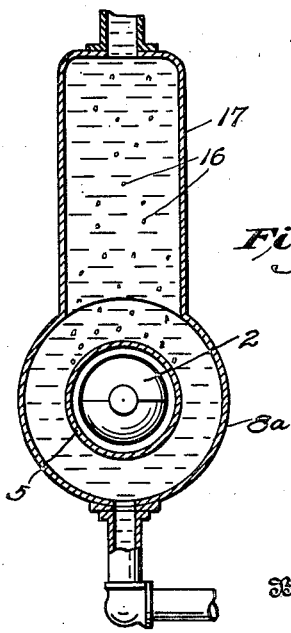
Fig. 2 is a transverse vertical sectional view on the line 2—2 of Fig. 1.

Heretofore, the burning of bituminous coal, as well as certain other solid fuels, in heating systems has been restricted largely to conventional type furnaces using under-feeding stokers, wherein the coal is burned at a high temperature and the resulting products of combustion passed through flues, or other heat-exchanging passages, where a substantial amount of the developed heat is transmitted through walls to the medium undergoing heating.

In such instances, as the fuel is forced upwardly into the fire box through a tuyère, air is forced in from the sides through openings provided in the tuyère, producing extremely high combustion temperatures which have resulted in the melting of part of the ash into pyrimids of clinkers, which must be removed from time to time since, otherwise, they tend to crowd or jamb into the fire box. Second, this admission of air under blower pressures into the fuel produces diffusion of much of the fine ash into the flues of the furnace, where deposits thereof greatly impair furnace efficiency unless the same are removed.

Another problem is that of ash removal. When the coal burns in the tuyère, which forms the lowest cavity of the fire box, much of the ash is pushed and blown to the side of the fire where it substantially impairs furnace efficiency by its insulating effect upon the side walls of the fire box.

The above and other problems have been eliminated or minimized in my improved furnace by the adaptation of a new principle of controlled fuel combustion.

Referring to the drawing, the numeral 1 designates the fuel hopper of my automatic furnace where the fuel supply is kept. The numeral 2 designates a feed worm arranged in the restricted but open bottom of the hopper, the worm being driven by an electric motor 3 through an associated speed-reducing and power-transmitting gearing 4. The worm 2 forces the coil into the combustion tube or conduit, shown at 5, and such feeding movement of the fuel takes place whenever the thermostat, indicated at 6, becomes heated by a substantial rise in temperature of the adjacent walls of the tube or conduit 5, such increase in temperature being produced by rearward travel of the active zone of fuel combustion 7 creeping back through the bed 8 of unburned fuel toward the thermostat. Normally, through the automatic control of the worm 2, the active combustion zone is maintained in longitudinally spaced relation from and forwardly of the end of the worm 2.

A water-containing casing 8a surrounds the fuel combustion region of the tube 5. Normally the casing 8a is filled with water, or other fluid undergoing heating, and the rate of heat exchange is such as to maintain the walls of the tube 5 in the zone of active fuel combustion at temperatures sufficiently low to prevent injury thereto by heat. Due to the comparatively small dimensions of the tube 5, it is practicable to form the walls thereof from special alloys which are highly resistant to deterioration under the furnace temperatures encountered and also to chemical action. A motor driven blower 9 delivers air to the entrance end of the combustion tube 5 through the ducts disclosed at 10 and 11 and the air-admission openings 12, the blower operating whenever the room thermostat 13 calls for heat.

Assuming that the furnace is producing a minimum of heat for a mild day, a light suction through the chimney 14 causes a reduced current of air to flow through the idle blower 9, the ducts 10 and 11, openings 12 and also through the coal in the hopper 1, so that a light fire will slowly burn back through the coal column 8. As this fire slowly works back toward the fuel entrance end of the tube 5, it will pass out of the water-jacketed section 8a into the uncooled part of the fuel-feeding tube adjacent the thermostat 6, causing the latter to be heated. Under these conditions, the thermostat 6 responds to close the circuit 6a in which the motor 3 is positioned, which will slowly turn the feeding worm 2, advancing fresh coal into the fire tube 5 and pushing the zone of active fuel combustion forward into the water-jacketed section. When this occurs, the thermostat 6 cools and opens the circuit 6a to stop the operation of the worm-operating motor 3.

From the above, it will be apparent that the thermostat 6, mounted in close thermal relation to the entrance end of the combustion tube 5, serves to keep the entrance end of the tube from exceeding a predetermined temperature, thereby holding the fire bed near the center of the combustion tube 5 and in registration with the casing 8a.

Now, let it be assumed that the room thermostat calls for heat and operates automatically to close the circuit 13a in which the motor of the blower 9 is situated. Such active operation of the blower 9 forces a strong current of air through the bed 8 and into the zone of active fuel combustion 7. This increased volume of air, produced by the operation of the blower, increases the burning rate of the fuel in proportion to the air introduced, since a solid bed of coal is directly in the path of air flow. This condition of operation is maintained until the water or other fluid in the casing 8a is sufficiently heated to raise the temperature of the air around the thermostat 13 enough to cause the room thermostat to open the circuit 13a, thereby interrupting the operation of the blower 9.

Because of the relatively small size of the combustion tube 5 which, for domestic installations, may be as small as 6 inches in diameter at its fuel-entrance end and 8 inches in diameter at its ash-discharging end, the cool walls of the tube prevent the fire bed from reaching a temperature sufficiently high to melt any substantial amount of ash into the form of enlarged clinkers, with the result that only small soft ash particles are formed, which drop from the discharge end of the tube harmlessly into the ash receptacle shown at 14a, this action taking place as the worm 2 slowly pushes all solids in the combustion tube toward the larger discharge end of the latter.

For certain installations, where considerable cooling of the furnace gases flowing to the chimney 14 is not objectionable, an auxiliary heating tank 15 may be used to absorb the available heat from the products of combustion. Due, however, to the tendency of fly ash to settle in horizontal flues and passages, particularly where there is a reduction in air velocity due to the contraction of cooling, the auxiliary heating tank is mounted vertically over the ash receptacle 14a, so that no substantial amounts of the fly ash will settle onto its walls. Also, any condensate which may collect on the vertical walls of the furnace gas passage, constituting the entrance end of the stack or chimney 14, will drain harmlessly into the ash contained within the receptacle 14a. The tank 15 is preferably disposed so that it is in the water return line to the boiler casing 8a, the tank 15 acting as a preheater, elevating the temperature of the water before it reaches the boiler proper.

In practice, the combustion tube 5 may be made of a nickel alloy, or may possess an inner liner composed of a metal highly resistant to the destructive action of chemicals and heat. While such special material is not necessary, the use of the same is rendered practicable by the small size of the combustion tube and the efficiency of the heat exchange which takes place through the walls thereof. The greatest factor in combustion efficiency is the close proximity of the burning fuel to the water or other fluid undergoing heating and, also, that no ash can accumulate between the burning fuels and the boiler walls, or between the furnace exhaust gases and the walls of the preheater 15.

Another important advantage of my present construction is the thermostatic control 6 which holds the fire bed or active combustion zone in approximately the center of the surrounding water-filled boiler provided by the casing 8a. If there is any tendency for the heated water to become sluggish in its circulation, small vapor bubbles, indicated at 16, are formed in the tall dome section 17 of the boiler casing 8a. Since this mixture of water and vapor is much lighter than water alone, a strong lifting action is produced, giving the effect of a conventional motor operated circulating pump, and at the same time providing the desired velocity of water flow over that part of the combustion tube which is delivering the most heat. As the bubbles rise and are gradually cooler, the same are dissipated before traveling through the associated radiator system.

Normally, sufficient convectional circulation exists in the fluid heat carrier due to the difference in the weight of the hot water rising in the casing 8a coupled with the flow of the relatively cool returning water from the radiators, but the small diameter of the dome section 17 provides the necessary lifting action when needed. While the arrangement usually dispenses with the necessity for employing a fluid-circulating pump for the heated water, it will be understood that I may employ such a pump in any capacity where the same may be found desirable.

Under normal operation, the only attention required is that of supplying adequate fuel to the hopper 1, either by hand or by conveyor, and the removal of ashes contained in the receptacle 14a by way of the outlet door 18. In lieu of the receptacle 14a, a deep ash pit may be utilized, such an ash pit having the capacity to hold the ash accumulation of a full season's operation. If desired, an auxiliary draft door 19, supported by the door 18, may be partly opened to correct for unusual chimney draft, or where there is an improper balance between the size and grade of coal used and the air pressure supplied by the blower 9.

While I have described my invention in one of its preferred embodiments, nevertheless, it will be understood that various changes may be made therein without departing from the spirit and scope thereof.

I claim:

1. Heating apparatus utilizing solid fuels, comprising an open-ended conduit formed to received fuel at one end and discharge ash at its other, there being a zone of active fuel combustion in said conduit toward the ash-discharging end thereof, a fuel-containing hopper in open registration with the fuel-receiving end of said conduit, a conveyor in the fuel-receiving end of said conduit registering with said hopper and operating to effect a positive longitudinal advance of the fuel through said conduit, an electric motor for imparting power rotation to said conveyor, said motor including an operating circuit, thermostatic switch means for said motor circuit directly connected with said conduit and influenced by the temperature of the walls thereof at a position intermediate of the length of the conduit and at substantially the juncture of its fuel-receiving and combustion zones for maintaining the zone of active fuel combustion in said conduit in predetermined spaced relationship to the fuel-feeding conveyor, an air-flow casing disposed exteriorly of said conduit, an electric motor driven fan positioned in said casing, an independent operating circuit for said fan motor, a room thermostatic switch disposed relatively remotely to the conduit governing the operation of said fan and its motor circuit, and air-admission means establishing air flow communication between said casing on the discharge side of said fan and said fuel hopper and an intermediate region of said conduit.

2. Apparatus for burning solid fuels, comprising an open-ended conduit, means for introducing solid fuels into said conduit for longitudinal advancement therein, electric motor-driven means for advancing such fuels longitudinally of said conduit toward and to a zone of active fuel combustion maintained therein, an operating circuit for the motor of said fuel-advancing means, thermostatic switch means for said motor circuit operatively positioned to be influenced by the temperature of the walls of said conduit in the region of the zone of active fuel combustion, means for introducing air under positive flow directly into said conduit intermediately of the length thereof and ahead of said zone of active fuel combustion, said last-named means including an electric motor-driven blower, an operating circuit for the motor of said blower, said latter circuit being independent of said first-named circuit, and a room-mounted thermostatic switch disposed relatively remotely to said conduit for governing the operation of said blower through its motor circuit.

3. Apparatus for burning solid fuels, comprising a horizontally positioned combustion tube, means for advancing fuels longitudinally of said tube toward a zone of active fuel combustion maintained therein, said means including an electric operating motor, thermostatically controlled means regulating the operation of said motor for maintaining the combustion zone at a predetermined spacing from the fuel-feeding mechanism without appreciably influencing the rate of fuel combustion, motor-driven means for admitting air directly into said tube under forced flow for passage through the fuel therein to the zone of active combustion, and a thermostatic switch responsive to the temperature of a zone to be heated by said apparatus for governing the operation of said air-admitting means and the rate of fuel combustion in said tube.

4. Heating apparatus utilizing solid fuels, comprising a fuel-receiving and burning conduit, motor-operated means for introducing fuels into said conduit and advancing the same longitudinally thereof toward a zone of fuel combustion within the conduit, motor-driven means for forcing air into said conduit for passage through the fuel therein to the zone of fuel combustion, thermostatic means responsive to the temperature of a zone heated by the combustion of fuel in said apparatus for governing the operation of said air-introducing means and the rate of fuel combustion in said conduit, and additional thermostatic means mounted on said conduit for governing the operation of the fuel introducing and advancing means to maintain said combustion zone in definitely spaced relation from said fuel introducing and advancing means.

5. In a furnace of the type described, a combustion tube, means surrounding said tube for maintaining a heat-absorbing fluid in contact therewith, means for charging solid fuel to said tube, means for supplying said tube with combustion air under positive flow to cause the air the pass through said fuel before reaching a zone of active fuel combustion in said tube, and control means responsive solely to variations in the wall temperature of said tube for effecting the operation of said fuel-charging means.

6. A solid fuel-burning furnace, comprising means for supporting a fuel bed, a motor-driven fan for supplying combustion air at pressures in excess of atmospheric to the fuel bed, a second motor for advancing solid fuel into said furnace and to said fuel bed, and control means for said second motor responsive in operation to the position of the fire bed on its supporting means for governing the delivery of fuel to said bed, said last-named control means being independent of the fan for supplying air to said fuel bed, and said motor-driven fan being responsive to heat demands of an environment heated by said furnace without regard to said fuel-supplying means for the furnace bed.

7. In a heating furnace, a wall structure defining a main combustion chamber forming a substantially enclosed fuel-combustion zone, a jacket forming a part of said wall structure and surrounding said fuel combustion zone to receive a fluid heat-absorbing medium, a fuel-injecting means for advancing solid fuel through said wall structure to said combustion zone, a thermal-responsive switching means mounted in close thermal relationship with the fuel-receiving end of said combustion zone and operatively connected to said fuel-advancing means, and a second motor-driven means for automatically supplying air at above atmospheric pressure directly to the fuel contained in the combustion zone in response to heat requirements in an atmosphere heated by said furance.

GEORGE W. CRISE.

REFERENCES CITED

The following references are of record in the file of this patent:

UNITED STATES PATENTS

| Number | Name | Date |
| --- | --- | --- |
| 2,047,579 | Cross, Jr. | July 14, 1936 |
| 2,126,104 | Fulton | Aug. 9, 1938 |
| 2,215,067 | Denison et al. | Sept. 17, 1940 |
| 2,218,895 | Selig | Oct. 22, 1940 |
| 2,261,585 | Lockrae | Nov. 4, 1941 |
| 2,269,800 | Wetzel | Jan. 13, 1942 |